United States Patent [19]

Dannhaeuser

[11] Patent Number: 4,887,312
[45] Date of Patent: Dec. 12, 1989

[54] METHOD AND APPARATUS FOR TRANSMISSION OF OPTICAL DATA BETWEEN TWO ELECTRICALLY SEPARATED TRANSMITTING RECEIVING UNITS

[75] Inventor: Friedrich Dannhaeuser, Munich, Fed. Rep. of Germany

[73] Assignee: Siemens Aktiengesellschaft, Berlin and Munich, Fed. Rep. of Germany

[21] Appl. No.: 232,938

[22] Filed: Aug. 17, 1988

[30] Foreign Application Priority Data

Sep. 14, 1987 [DE] Fed. Rep. of Germany ....... 3730843

[51] Int. Cl.⁴ .............................................. H04B 9/00
[52] U.S. Cl. ................ 455/607; 340/870.28; 455/608; 455/617
[58] Field of Search ............... 455/600, 603, 606, 607, 455/608, 612, 617, 618, 619; 340/870.14, 870.28, 870.29

[56] References Cited

U.S. PATENT DOCUMENTS 4,525,873 6/1985 Baues ................................. 455/612

FOREIGN PATENT DOCUMENTS 0163928 9/1984 Japan ................................. 455/612

Primary Examiner—Robert L. Griffin
Assistant Examiner—Leslie Van Beek
Attorney, Agent, or Firm—Hill, Van Santen, Steadman & Simpson

[57] ABSTRACT

A method and apparatus for transmitting data between two transmission-receiving units with infrared signals wherein one of the two transmitting receiving units does not have its own power supply and is to be supplied with energy by light received with photocells. When the data receiver and energy receiver are in close proximity, blooming of the data can occur and, thus, faulty data transmission results. In the invention, the data and energy are intermittently and alternately transmitted such that during the energy transmission the data transmitter of the first transmitting receiving unit sends out auxiliary synchronization pulses and after predetermined time both the energy transmission as well as the auxiliary transmission pulses are simultaneously shutoff. The trailing edges of both pulses can be unambiguously recognized even during blooming and are used as a synchronization signal which causes the second transmitting receiving unit to start sending data.

5 Claims, 2 Drawing Sheets

METHOD AND APPARATUS FOR TRANSMISSION OF OPTICAL DATA BETWEEN TWO ELECTRICALLY SEPARATED TRANSMITTING RECEIVING UNITS

BACKGROUND OF THE INVENTION

1. Field of the Invention

This invention relates to a method and apparatus for optical data transmission between two electrically separated transmitting-receiving units in which transmitting-receiving units have the following features which are that each of the transmitting-receiving units has at least one data transmitter and one data receiver and the first transmitting-receiving unit has a light transmitter for transmission of light energy and the second transmitting-receiving unt has a light receiver for receiving the transmitted light energy and also includes means for converting the light energy into electrical energy and includes means for storing the electrical energy for power purposes.

In a preferred embodiment in the optical bidirectional data transmission equipment such as electric lock systems, one of the two transmitting-receiving untis expediently the key is constructed as a small maintenance free unit. The use of a battery as an internal power supply contradicts this desired object for one of the transmitting-receiving units as it requires that the discharged and dead battery be changed and also makes it necessary to monitor the charged condition of the battery.

So as to be completely independent of the battery, it is desirable to provide an external power supply for one of the transmitting-receiving units expediently the lock, and this external power supply can be constructed with photocells which receive light energy.

A problem arises that both the data as well as the energy for the power supply of the one tansmitting-receiving unit are transmitted with light. Given a data receiver and energy receiving photo element that are spaced closely together, the data information can be in error due to blooming whereby errors result in the data transmission and great accuracy can no longer be assured.

2. Description of the Related Art

German Patent No. 0.075,701, European patent Application No. 0.053,790, U.S. Pat. No. 4,091,734, European Patent No. 0,103,790 and Patent Abstracts of Japan, Vol. 10, No. 386 E-4672443 of Dcc. 24, 1986 entitled "Feed Transmission System Using Optical Fiber" all disclose various data transmitting systems of which the disclosures are hereby incorporated by refernce.

SUMMARY OF THE INVENTION

The present invention relates to a method and apparatus for an optical data transmission means wherein one of the transmitting receiving units is supplied with electrical energy by way of photocells in a manner which prevents the transmitted data from being incorrectly received and incorrectly detected due to the transmission of light energy.

An object of the invention is achieved in the following method steps which are performed in succession:

(a) The first transmitting-receiving unit transmit light energy for a predetermined time and this light energy is converted into electrical energy at the second transmitting-receiving unit and is stored for electrical power supply;

(b) The data transmitter of the first transmission-reception unit starts to transmit an auxiliary synchronization pulse during this predetermined time;

(c) The emission of the light energy and of the auxiliary synchronization pulse are simultaneously shutoff; and (d) The twosimultaneously occurring shut-off edges are detected at the second transmitting-receiving unit and used as a synchronization signal.

It is a feature of the present invention that power is transmitted between two transmitting-receiving units by transmitting light energy from the first transmitting-receiving unit to the second transmitting-receiving which detects such light energy and converts it into electrical energy and then stores it for local pwoer and wherein light energy for power is intermittently transmitted from the first to the second unt and during periods when light energy is not being transmitted, data is transmitted between the units.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENT

Figure 3:
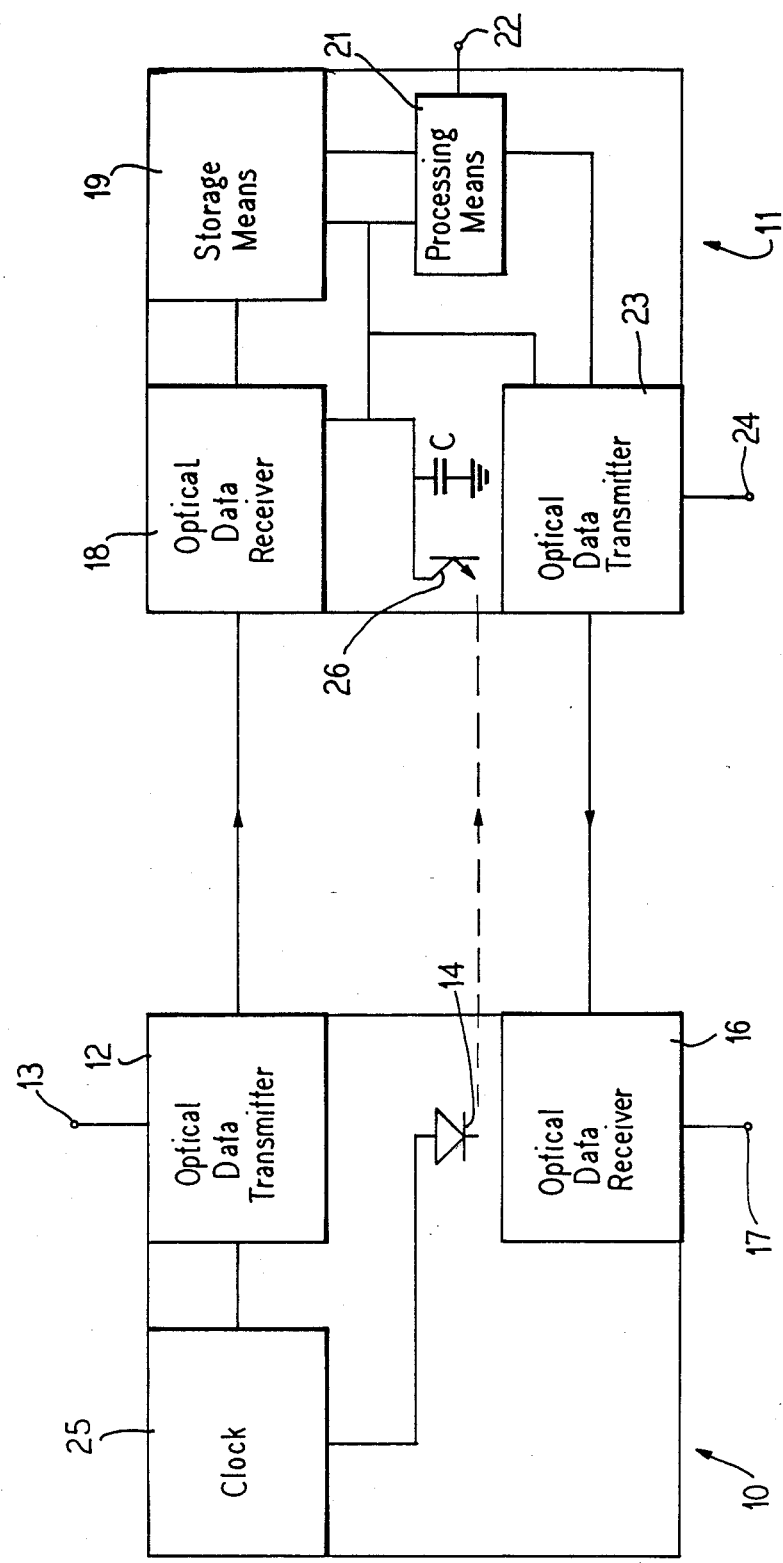
FIG. 3 is a block diagram of an exemplary embodiment of the equipment utilized to practice the invention.

FIG. 3 illustates the apparatus for practicing the method of the invention which inclues a first tansmit-receive station 10 and a second remotely located transmit-receive station 11. The transmit-receive station 10 has an optical data transmitter 12 which receives an input of data to be transmitted at terminal 13 and also an input from a clock 25 and is capable of transmitting data to the remote station 11 which has an optical data receiver 18 which receives the data from the optical data transmitter 12 and supplies it to a storage means 19 which supplies an output to a processing means 21 which supplies an output at terminal 22. The processing means 21 is also connected to optical data transmitter 23 which can receive data at an input terminal 24. A light transmitter 14 is mounted in transmit-receive station 10 and is connected to the clock 25 so as to periodically transmit light energy toa light receiver 26 at the remote staton 11. The light receiver 26 might be a PIN diode, for example, and the light transmitter 14 might be a laser, for example. The light receiver 26 converts the light eergy into electrical energy and supplies it to a capacitor C which serves as the local powe supply for the remote transmitter-receiver 11. The voltage across the capacitor C is connected to the optical data receiver 18, the storage means 19, the processing means 21 and to the optical data transmitter 23 as illustrated.

An optical data receiver 16 in station 10 receives data from data transmitter 23.

Figure 1:
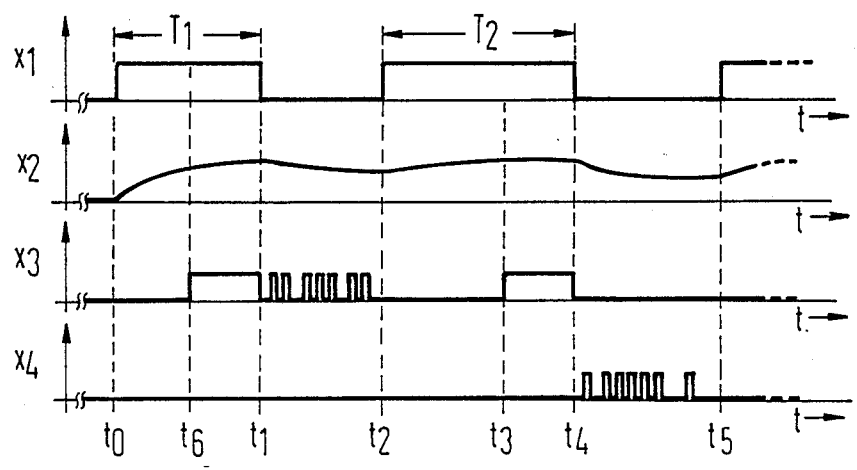
FIG. 1 is a plot of the signals transmitted between the two transmitting-receiving units as a function of time.
Figure 2:
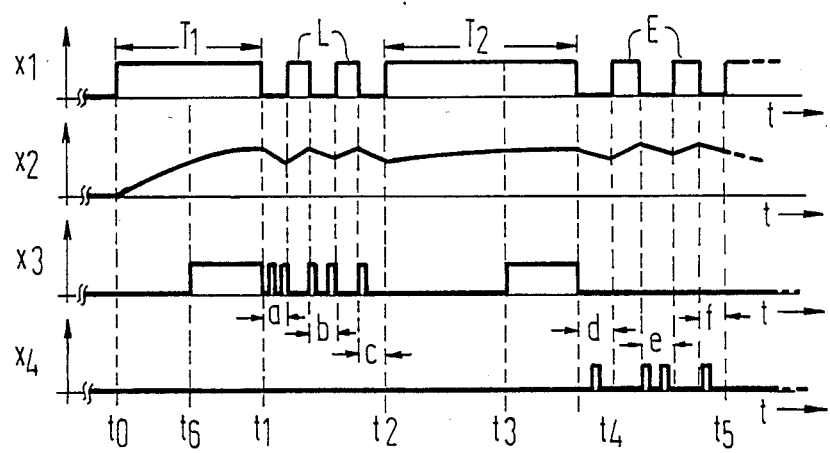
FIG. 2 illustrates a modification of the invention and illustrates the plot of signals transmitted as a function of time.

The following symbols are used in FIGS. 1 and 2: $x_1$ chronological course of the light energy sent from the first to the second transmitter-receiver. $x_2$ voltage across the charging capacitor of the second transmitter-receiver.

$x_3$ data signal for auxiliary synchronization comprising a pulse sent by the first trasmitter-receiver.

$x_4$ data signal sent by the second transmitter-receiver.

$t_0$ start of the first light transmission.

$t_1$ end of the first light transmission and time when the second transmitter-receiver is to receive the end of the data transmission of the first trasmitter-receiver and the beginning of the second light transmission $t_3$ beginning of the auxiliary synchronization pulse on the data channel of the first transmitter-receiver $t_4$ simultaneous ending of the second light transmission and of the auxiliary synchronization pulse and the simultaneous start of the data transmission from the second to the first trnsmitter-receivers $t_5$ end of the data transmission of the second transmitter-receiver.

$t_6$ beginning of the auxiliary synchronization pulse during the transmission of the first light energy transmission $T_1$ a first predetermined time.

$T_2$ a second predetermined time.

a,b,c data sub-transmissions of the first transmitter-receiver.

d,e,f data sub-transmissions of the second transmitter-receiver.

L,E light energy pulses.

The data transmission equipment required for data transmission according to the method of this invention comprises two transmitter-receiver units each of which is provided with an optical data transmitter and with an optical data receiver. The first transmitter-receiver 10 has a light transmitter 14 for transmission of light energy whichis received by the second transmitter-receiver 11 with the light eceiver 26 which may expediently be one or more photo elements and the light receiver 26 converts the transmitted light energy into electrical energy. The second transmitter-receiver 11 also has means for storing such electrical energy, which might be, for example, a capacitor C. The second transmitter-receiver 11 is supplied with power in this manner. The second transmitter-receiver 11 also contains means for storing 19 and means for processing 21 the received data so that, for example, after the data has been processed, it can again be communicated with the data transmitter 23 to the first transmitter-receiver by using optical transmission.

FIG. 1 illustrates the method of the invention for data transmission as shown by the signal curve as an exemplary embodiment. It is assumed in this exemplary embodiment that the first transmitter-receiver 10 supplies light energy first before it transmits its data to the second transmitter-receiver 11 which receives it with photocells 26. However, it is possible that the data are first transmitted by the second transmitter-receiver 11 which receives the light energy. It is critical in the present invention that the second transmitter-receiver 11 receive adequate light energy before it receives or sends the data, so that a reliable power supply for the second transmitter-receiver, which receives the energy is assured.

FIG. 1 shows in the top row a time plot of $x_1$ of the light energy sent from the first to the second transmitter-receiver. The emission of the light energy for the first predetermined time $T_1$ starts at the time $t_0$ and ends at time $t_1$. The received light energy at transmitter-receiver 11 is converted into electrical energy and is stored as the powe suppply in, for example, the capacitor C. After time $t_1$, the first transmitter-receiver 10 sends the data that are to be transmitted as a pulse sequence as shown in curve $x_3$, in FIG. 1. These data are stored in the second transmitter receiver 11 or are processed therein. The data transmission of the first transmitter-receiver 10 to the second transmitter-receiver 11 is concluded at time $t_2$. During data transmission, the second transmitter-receiver 11 is supplied with power from the energy stored in the capacitor C. The voltage on the charging capacitor C is shown in curve $x_2$ of FIG. 1.

After the data transmissiondescribed, the first transmitter-receiver 10 sends light energy during a second, predetermined time $T_2$ through time $t_4$ and this light energy is converted into electrical energy in the second transmitter-receiver 11 and is stored in capacitor C. During time $T_2$, the received data can be processed in the second transmitter-receiver 11 and, for example, can be compared to data already contained in a read-only memory, or can be calculated or encoded according to a defined algorithm and the data to be transmitted by the second transmitter-receiver 11 can be identified. This second, predetermined time $T_2$ is selected such that the processing time and the time needed by the second transmitter-receiver 11 for the calculation of the data is shorter than $T_2$.

An auxiliary synchronization pulse is sent out by way of the data transmitter 12 of the first transmitter-receiver 10 during the time $T_2$, for example, starting at time $t_3$. At time $t_4$, the light energy transmission and the data signal are simultaneously shut-off. These two simultaneously appearing shut-off edges identify an unambiguous condition which can be clearly recognized even for an energy receiver and an optical data receiver which are in close proximity. When these two trailing edges of both the energy transmitter 14 as well as the data transmitter 12 of the first transmitter-receiver 10 shut their light off, the second transmitter-receiver 11 knows that the first transmitter-receiver is ready to receive data and data transmission of the second transmitter-receiver 11 which receives energy cancommence. The first and the second transmitter-receiver are thus synchronized. The second transmitter-receiver 11 starts to transmit its data as shown by curve $x_4$ in FIG. 1. When this data transmission has been concluded at time $t_5$, light energy is again transmitted as needed and the procedure starts over again at $t_0$.

This synchronization can also be used for the transmissions from the first to the second transmitter-receiver in order to place the second transmitter-receiver 11 in readiness to receive at the proper time. For this purpose, the data transmitter emits light during the first, predetermined time, starting for example at $t_6$ i.e. between $t_0$ and $t_1$, and this light is simultaneously shut-off together with the shut-off of the energy transmission.

It should be noted here that the first, predetermined time $T_1$ must be selected to have a length such that a reliable power supply for the second transmitter-receiver 11 is assured.

FIG. 2 illustrates a further example of the manner of energy transmission and of data exchange between the two transmitter-receivers 10 and 11 according to the method of our invention. The method of FIG. 2 differs from FIG. 1, in that data transmission from the first to the second transmitter-receiver i.e. between the times $t_1$ and $t_2$, is subdivided into individual data sub-transmissions periods a, b, c of, for example, one byte each which can be stored in the second transmitter-receiver 11. However, an energy transmission in the form of individual light pulses L from the first to the second transmitter-receiver occurs during the pauses between data subtransmission periods in order to re-charge the capacitor during the pauses. Longer data transmissions times from the first to the second transmitter-receiver can be reliably transmitted without the supply of power in the second transmitter-receiver being depleted. Further, this modification of the invention has the advantage that high power consumption during read-out from the individual memory (for example, an $E^2$ Prom 2506) contained in the second transmitter unit 23 is sufficient and the minimum voltage needed is available. Although the subdivision of the data transmissoins into individual bytes or bits reduces the data transmission rate, a reliable power supply which has good smoothing of the voltage which is supplied by the capacitor is achieved.

In order to also assure a reliable power supply when sending the data from the second transmitter-receiver 11 to the first transmitter-receiver 10, such data transmission can also be subdivided into individual data sub-transmissions period d, e, f during which pauses energy pulses E are transmitted from the first to the second transmitter-receiver. This is shown in FIG. 2 starting at time $t_4$.

As is shown in FIGS. 1 and 2, it is possible with the method of our invention to supply one of the two transmitter-receivers "from the outside" independently of the mains and independently of a battery in an optical, bidirectional data transmission equipment which is accomplished by using optical irradiation of photo elements and also to achieve reliable data transmission. Blooming of the data pulses with light due to the energy transmissions needed for power supply is avoided in that a time separation between data transmission and energy transmission occurs. Since no communication channels in addition to the signal data transmission channel are available, synchronization between the two transmitter-receivers is achieved in a fashion such that an auxiliary synchronization pulse is transmitted on the data transmission channel during the energy transmission, and this auxiliary synchronization pulse is shut-off simultaneously with the energy pulse. Disturbing extraneous light is not present after this simultaneous shut-off and an unambiguous condition is thus achieved which allows reliable synchronization between the first and second data transmission units.

Infrared light is preferably used for the transmission of the light energy and of the data pulses.

The method of our invention can be advantageously used for electronic lock systems. The data transmissoin means can be composed of an electronic lock comprising an electronic key which represent the two transmitter-receivers. The electronic key has infrared diodes and infrared photo elements. The key is introduced into the lock as in conventional lock systems, with the cooperating diodes being mounted in the lock. After checking the diologue with infrared messages between the lock and the key, the lock opens. The power supply of the electronic key is implemented with photo elements.

Although the invention has been described with respect to preferred embodiments, it is not to be so limited as changes and modifications can be made which are within the full intended scope of the invention as defined by the appended claims.

I claim as my invention:

1. A method for the optical data transmission of data between first and second transmitter-receivers which are spaced apart;

said first and second transmitter-receivers each has a data transmitter and a data receiver; the first transmitter-receiver has a light transmitter for transmitting light energy; the second transmitter-receiver has a light receiver for receiving the light energy transmitted by said first transmitter-receiver and said second transmitter-receiver has means for converting and storing the received light energy into electrical energy, characterized by the successive steps of:
   (a) transmitting by said first transmitter-receiver light energy for a predetermined time, receiving said light energy at said second transmitter-receiver and converting it inot electrical energy and storing said electrical energy to energize said second transmitter-receiver,
   (b) sending with the data transmitter of said first transmitter-receive an auxiliary synchronization pulse during said predetermined time;
   (c) simultaneously shutting off the emission of the light energy and of the auxiliary synchronization pulse at said first transmitter-receiver,
   (d) and detecting and using the two, simultaneously appearing shut-off edges at the second transmitter-receiver as a synchronization signal.

2. A method according to claim 1, wherein said synchronization signal places said second transmitter-receiver into readiness to transmit so that it transmits data to said first transmitter-receiver.

3. A method according to claim 1, comprising using said synchronization signal to enable said second transmitter-receiver to receive data from said first transmitter-receiver and causes said first transmitter-receiver to transmit data to said second transmitter-receiver.

4. A method according to claim 1 or 2 or 3, characterized in that the data transmission of the first transmitter-receiver is subdivided into data subtransmissions; and said data sub-transmissions are stored in said second transmitter-receiver and light energy is respectively sent from said first transmitter-receiver to said second transmitter-receiver between said data sub-transmissions; and said light energy is converted into electrical energy and stored at the second transmitter-receiver and light energy is sent for the predetermined time after the emission of the last data sub-transmission by the first transmission-reception unit.

5. A method according to claim 1 or 2 or 3 wherein infrared energy is used for transmitting data between said first and second transmitter-receivers.

* * * * *